June 22, 1954
S. N. POCOCK
2,682,031
VOLTAGE STABILIZER CIRCUITS
Filed March 6, 1953
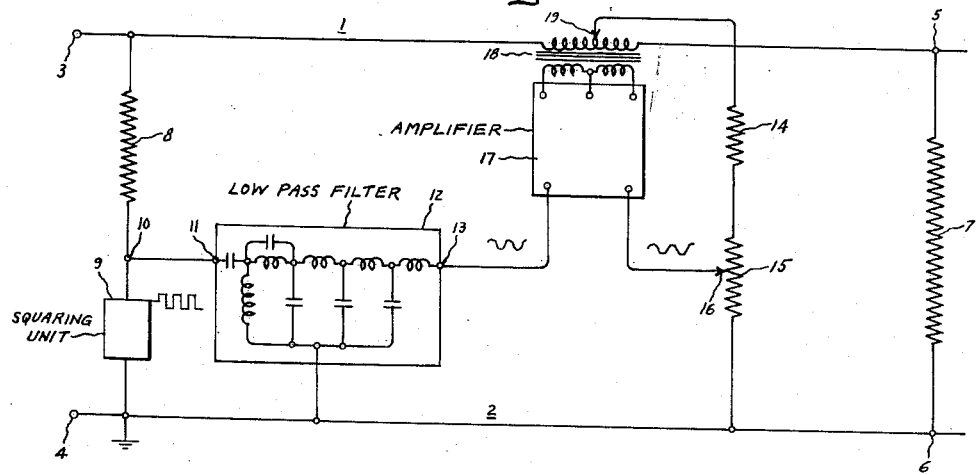
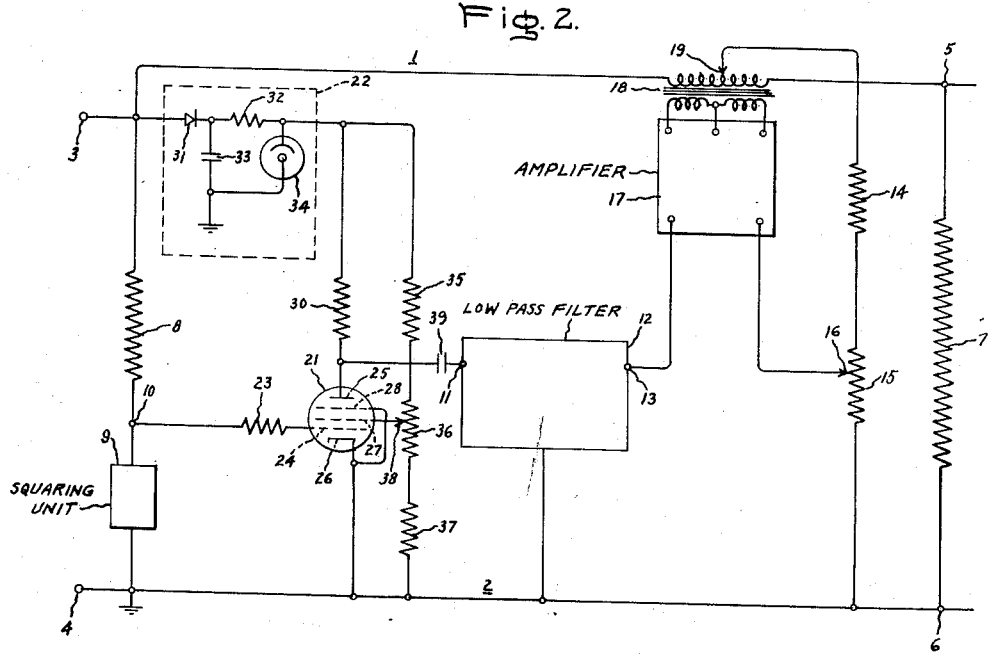
Inventor:
Sydney N. Pocock,
by Charles M. Hutchins
His Attorney.

Patented June 22, 1954

2,682,031

UNITED STATES PATENT OFFICE 2,682,031

VOLTAGE STABILIZER CIRCUITS

Sydney Norman Pocock, Buckhurst Hill, England, assignor to The Edison Swan Electric Company Limited, a British company Application March 6, 1953, Serial No. 340,854

Claims priority, application Great Britain March 11, 1952

9 Claims. (Cl. 323—45)

The present invention relates generally to alternating voltage stabilizer circuits of the kind in which a control voltage is derived by amplifying the difference between a voltage proportional to the controlled voltage or current and a comparison voltage having the same frequency as the supply, and in which the said control voltage is applied in series with the load in such a manner that the said difference in voltage is consequently reduced.

It is an object of the present invention to provide an improved alternating voltage stabilizer circuit that provides substantially instantaneous response to source voltage variations.

It is another object of the present invention to provide an improved alternating voltage stabilizer circuit that introduces a negligible amount of distortion in the waveform of the stabilized voltage.

It is still another object of the present invention to provide an alternating voltage stabilizing circuit that is substantially unaffected by limited frequency changes in the supply voltage being stabilized.

It is a further object of the present invention to provide an improved alternating voltage stabilizing circuit whose stabilizing action is substantially independent of load changes over a wide range including changes of power factor.

It is still a further object of the present invention to provide an improved alternating voltage stabilizing circuit of the type in which a control voltage is formed by amplifying the difference between a voltage proportional to the control voltage or current and a comparison voltage having the same frequency as the supply wherein the amplifier and output transformer for performing these functions are required only to handle the differential power.

Briefly stated, in accordance with one aspect of the present invention, there is provided an alternating voltage stabilizer circuit of the kind specified, i. e., of the kind in which a control voltage is formed by amplifying the difference between a voltage proportional to the controlled output voltage or current and a comparison voltage having the same frequency as the supply, and where the said control voltage is applied in series with the load in such a manner that the said difference in voltage is consequently reduced, wherein the supply voltage is applied to a squaring unit to give a rectangular waveform from its output terminals, the waveform being passed to a low-pass filter, phase compensated over a desired frequency band, providing high attenuation for all harmonic frequencies above the fundamental to give an output comparsion voltage having a waveform of very low harmonic content in phase with the original supply and of constant amplitude.

For additional objects and advantages, and for a better understanding of the invention, attention is now directed to the following description and accompanying drawings. The features of the invention, which are believed to be novel are particularly pointed out in the appended claims.

In the drawings:

Fig. 1 is a schematic circuit diagram, partly in block form, of an alternating voltage stabilization circuit embodying the principles of the present invention;

Fig. 2 is a schematic circuit diagram, partly in block form, of an alternating voltage stabilization circuit embodying the principles of the present invention and including a preferred method of squaring the input waveform.

Referring now to Fig. 1, there is shown a section of a power line or main, comprising a pair of conductive wires or lines 1 and 2. Line 1 may conveniently be referred to as the live wire to distinguish it from line 2 shown connected to ground in well-known manner. One end of the section is shown having a pair of input terminals 3, 4, adapted for connection to a suitable A. C. supply or source (not shown) for energizing the section. The other, or output circuit end of the section, is shown as comprising a pair of output terminals 5, 6, across which is connected a load represented by the resistor 7, but which may have the dimensions of impedance for the applied electrical energy.

Across the input terminals 3, 4, there is connected a dropping resistor 8 in series with a squaring unit 9 which is preferably in the form of a disk or disks of material such as silicon carbide having a non-linear volt-ampere characteristic. Commercially such material is known here and abroad under various trade names such as Thyrite and Metrosil. Alternatively, we may choose to employ clamping diodes biased from a suitable direct voltage source such as a battery, or pentode type electron discharge devices or valves operating under anode limiting conditions from a stabilized direct voltage, the latter being illustrated in Fig. 2 and described in greater detail infra.

The purpose of this arrangement is to provide means for sampling the electrical wave applied to the input terminals 3, 4, and for deriving therefrom a corresponding rectangular wave of predetermined amplitude and represented by the expression:

$$y = 4E(\cos x - \tfrac{1}{3}\cos 3x + \tfrac{1}{5}\cos 5x - \tfrac{1}{7}\cos 7x \text{ etc.})$$

By means of an output terminal shown as an intermediate tap 10 between the squaring unit 9 and the resistor 9, the squared waveform is applied to an input terminal 11 of a low-pass filter 12 of orthodox design which is phase compensated to provide substantially linear phasing characteristics in the source frequency region, i. e., over a frequency range extending a few cycles on either side of the applied line or source frequency and which provides relatively high attenuation for higher frequency components, particularly for all of the other harmonic terms in the rectangular wave expression given above. Thus, for example, assuming a line frequency of 50 cycles per second the phase compensation should advantageously extend over a band of approximately 48 to 52 cycles per second, i. e., about 4% of the line frequency in both directions, and the attenuation should be relatively high for frequencies of about 140 cycles per second upwards. The filter 12 may be any well-known filter exhibiting the stated frequency and phase characteristics and its precise design forms no part of the present invention.

In accordance with the above-mentioned filter characteristics, therefore, the output of the filter 12, appearing at the output terminal 13, has a waveform with very low harmonic content and in phase with the original supply, but of substantially constant amplitude due to the amplitude cut-off behavior of the squaring unit. The output of the filter 12 may conveniently be referred to as a comparison or reference voltage.

A fraction of the output voltage of the section, appearing across the output terminals 5 and 6, is selected by means of a voltage divider connected effectively across the output of the section. This voltage divider comprises a resistor 14 in series with an adjustable potentiometer 15 having a variable output tap or slider 16 thereon for selecting a fraction of the output voltage.

The difference between the selected fraction of the output voltage on the slider 16 and the comparison or reference waveform appearing at the output terminal 13 of the filter 12 is applied in conventional manner to a linear amplifier 17 having low phase shift and distortion at the source frequency (50 cycles per second in the illustration) and a voltage gain that is relatively large compared with unity. The upper frequency response is preferably 100–200 times the fundamental frequency, namely, 5,000–10,000 cycles per second in the present illustration.

The output of the amplifier 17 comprises a control voltage which is used to buck or boost the line voltage by means of a suitable transformer 18 by which it is coupled to the live line 1 at a point between the incoming supply and the load 7. In the illustrated embodiment the secondary winding of the transformer 18 is connected in series with the live line 1 between the source and the load 7. In effect, therefore, the output of the amplifier 17 is applied to the line 1 in series with the output circuit including the terminals 5, 6 and the load 7. The direction of connection is such that degeneration, i. e., negative feedback is obtained.

The whole system now forms a feedback loop in which the feedback polarity is such that output of the amplifier 17 produces an adjustment of output voltage appearing across the load 7 so as to minimize the difference between the comparison or reference waveform at the filter output terminal 13 and the sample waveform at the potential divider slider 16. Not only is this true for amplitude, but also of phase and more particularly of waveform. If the gain of the amplifier 17 is relatively high compared with unity the waveform appearing at the slider 16 is essentially identical to that at the filter output terminal 13.

The correction thus obtainable may generally be regarded as adequate for commercial applications where a limited degree of stability is satisfactory by reason of the complete absence of other forms of instability such as waveform changes. However, the unit will still not give complete cancellation of any input voltage change, but if the live end, i. e., the end remote from ground, of the potential divider comprising resistor 14 and potentiometer 15 is connected to a tap 19 nearer the output end of the secondary winding of the transformer 18, the remaining turns outside this potential divider will supply a small correcting voltage in series with the load which will insure substantially perfect compensation which is still effectively independent of load and mains voltage fluctuations.

Providing the gain is relatively high compared with unity any small variations in the gain of the amplifier 17 are of small consequence, but in any case, the amplifier can have an internal negative feedback arrangement as is commonly employed in audio amplifiers to minimize distortions, to give low output impedance and to stabilize the gain of corresponding aging and replacement of electron discharge devices or valves.

In the above description it has been assumed that the main or source frequency is 50 cycles per second, but it will be understood that the stabilizer circuit can be designed for any frequency provided that the filter design is varied accordingly. For example, it may be readily designed to stabilize electrical waves having the common 60 cycle-per-second power line frequency commercially available from public utility corporations in the United States of America.

Referring now to Fig. 2, there is shown a circuit in which the same reference numerals are retained for similar component parts. An unstabilized alternating voltage supply is provided across terminals 3 and 4 and a precision squared waveform is then obtained by utilizing a non-linear resistance device of the type shown in Fig. 1, i. e., one whose resistance decreases with an increase of current therethrough such as a silicon carbide disk, generally referred to as Thyrite or Metrosil, in conjunction with a clipper circuit comprising an electron discharge type amplifying device or valve shown as a pentode 21 operating under anode limiting conditions from the stabilized direct reference voltage provided by the rectifier glow discharge combination included within the dotted square 22. It will be appreciated that precision of the squared waveform may be enhanced by utilizing a plurality of silicon carbide disks and pentode valves in the manner suggested. The precision squared waveform is now passed to a low pass filter 12 designed to have phase and amplitude correction over the supply frequency range. At the filter output terminal 13 we have a comparison or reference waveform of constant amplitude and a high purity. This reference waveform is compared with a fraction of the output voltage derived from the resistance 14 and the adjustable potentiometer 15. The difference between the two voltages is amplified by the amplifier 17 and the output therefrom is used as a control voltage to buck or boost the line via a transformer 18 connected between the incoming supply and the load 7. Thus a degenerative feedback loop is formed which provides an adjustment of output voltage so as to minimize the difference between the reference waveform at 13 and the sample waveform at the slider connection 16 on the adjustable potentiometer 15.

The output of the squaring unit 9, appearing at point 10, is passed through a self-biasing resistance element 23 to the control grid 24 of the device 21 in conventional manner. The device 21, shown as a pentode, includes an anode 25, a cathode 26, a screen grid 27, and a suppressor grid 28 in addition to the previously-mentioned control grid 24. The cathode 26 is grounded and the suppressor grid 28 is tied directly to the cathode in conventional manner. The anode 25 is supplied with operating potential through a load resistor 30 which, in turn, is connected to a stabilized direct reference source shown as the rectified glow discharge combination within the dotted square 22, the precise details of which are well-known and form no part of the present invention.

As is apparent from an inspection of the glow-discharge combination within the dashed box 22, it functions as means for providing a stabilized direct reference potential from the main source and it comprises a half-wave rectifier circuit including a conventional diode rectifier device shown as a barrier-layer type diode 31 connected to the main source via the input terminal 3 and followed by a conventional resistance-capacitance, low-pass filter section 32, 33. The output of the filter section 32, 33 is shunted by a glow-discharge type tube 31, in known manner for stabilization purposes.

The screen grid 27 of the device 21 is likewise supplied with stabilized operating potential from the combination 22, the correct potential being determined by a voltage divider arrangement comprising a first resistor 35, a potentiometer 36, and a second resistor 37 connected in series in the order named between the output of the combination 22 and ground. A slider 38 on the potentiometer 36 provides an adjustable means for applying the correct potential to the screen grid 38.

In order to stabilize the amplitude value of the precision waveform appearing at the anode 19, it is believed apparent from an inspection of Fig. 2 that the operating level of the device 21 may be established in well-known manner so that the peaks of the rectangular wave are clipped, i. e., amplitude-limited in an abrupt manner at a predetermined level established by the direct reference potential provided by the stabilized rectifier combination 22.

The output of the valve device 21 is coupled from the anode 25 to the filter input terminal 11 by means of a conventional coupling capacitor 39. The circuit operation from this point on is essentially like that of the preceding figure, described in detail above. The advantage of the circuit of Fig. 2 over that of Fig. 1 resides primarily in the improved stability of the precision comparison or reference wave obtainable for application to the filter input terminal 11.

It is believed that a stabilizer circuit of the kind described and shown in the Figs. 1 and 2 of the accompanying drawing has the following advantages:

Its action is truly instantaneous, correction being made for a sudden change in input voltage in a fraction of a cycle, usually between $\frac{1}{10}$ and $\frac{1}{100}$ of a cycle. This is limited only by the upper frequency response limit of the audio amplifier and output transformer.

The waveform distortion is negligible. In fact, providing sufficient attenuation of harmonics is provided in the filter unit, the output waveform can be superior to the incoming waveform, provided the amplifier is designed to handle the additional volt-amperes involved.

The stabilizer is unaffected by frequency changes within specified limits which may be, say 48 to 52 C. P. S. for general use on a 50 cycle supply. The unit is also essentially independent of load changes over a wide range including changes of power factor.

Another advantage is that the amplifier and output transformer are required only to handle the differential power, whereas in many types, as for example that using audio transformer and saturable reactor, the differential volt-amperes handled by the reactor is very many times the differential power owing to the phase relationship.

While specific embodiments have been shown and described, it will of course be understood that various modifications may be made without departing from the principles of the invention. The appended claims are therefore intended to cover any such modifications within the true spirit and scope of the invention.

What I claim as new and desire to secure by Letters Patent of the United States is:

1. In an alternating voltage stabilization circuit having input and output circuits electrically connectible intermediate a source of alternating voltage to be stabilized and a load, squaring means for deriving from said source an electrical wave having a substantially rectangular waveform of predetermined amplitude and a fundamental component of corresponding phase to that of said source, said squaring means comprising material having a non-linear volt-ampere characteristic, filtering means for attenuating from said rectangular wave substantially all harmonic frequencies above the fundamental frequency of said source thereby to provide a comparison voltage, means for deriving from said output circuit a voltage proportional to the output voltage, means for amplifying the difference between said comparison voltage and said proportional voltage thereby to produce a control voltage, and means for applying said control voltage intermediate said source and said load in such manner that said difference in voltage is consequently reduced.

2. An alternating voltage stabilization circuit comprising an input circuit adapted for the application thereto of a source of alternating voltage to be stabilized, an output circuit adapted to be connected to a load, squaring means for deriving from said source an electrical wave having a substantially rectangular waveform of predetermined amplitude and substantially in phase with said source, said squaring means comprising material having a non-linear volt-ampere characteristic, filtering means for attenuating from said rectangular wave substantially all harmonic frequencies above the fundamental frequency of said source thereby to provide a comparison voltage, means for deriving from said output circuit a voltage proportional to the output voltage, means for amplifying the difference between said comparison voltage and said proportional voltage thereby to produce a control voltage, and means for applying said control voltage in series with said output circuit in such manner that said difference in voltage is consequently reduced.

3. An alternating voltage stabilization circuit comprising an input circuit adapted for the application thereto of a source of alternating voltage to be stabilized, an output circuit adapted to be connected to a load, a squaring unit, said squaring unit including at least one element of silicon carbide having a non-linear volt-ampere characteristic, means for applying a fraction of said source voltage to said squaring unit thereby to produce an electrical wave having a substantially rectangular waveform of predetermined amplitude and substantially in phase with said source, a low-pass filter phase compensated in the source frequency region and adapted and arranged to attenuate from said rectangular wave substantially all harmonic frequencies above the fundamental frequency of said source thereby to provide a comparison voltage, means for deriving from said output circuit a voltage proportional to the output voltage, means for amplifying the difference between said comparison voltage and said proportional voltage thereby to produce a control voltage, and means for applying said control voltage in series with said output circuit in such manner that said difference in voltage is consequently reduced.

4. An alternating voltage stabilization circuit comprising an input circuit adapted for the application thereto of a source of alternating voltage to be stabilized, an output circuit adapted to be connected to a load, squaring means comprising a squaring unit for deriving from said source an electrical wave having a substantially rectangular waveform of predetermined amplitude and substantially in phase with said source, said squaring unit comprising material having a non-linear volt-ampere characteristic, filtering means having substantially linear phasing characteristics in the region of said source frequency for attenuating from said rectangular wave substantially all harmonic frequencies above the fundamental frequency of said source thereby to provide a comparison voltage, means for deriving from said output circuit a voltage proportional to the output voltage, an amplifier having an input and an output circuit, means for applying the difference between said comparison voltage and said proportional voltage to said amplifier input circuit thereby to produce a control voltage, and a transformer in said amplifier output circuit for applying said control voltage in series with said output circuit in such manner that said difference in voltage is consequently reduced.

5. An alternating voltage stabilization circuit comprising an input circuit adapted for the application thereto of a source of alternating voltage to be stabilized, an output circuit adapted to be connected to a load, squaring means for deriving from said source an electrical wave having a substantially rectangular waveform of predetermined amplitude and substantially in phase with said source, filtering means for attenuating from said rectangular wave substantially all harmonic frequencies above fundamental frequency of said source thereby to provide a comparison voltage, means for deriving from said output circuit a voltage proportional to the output voltage, means for amplifying the difference between said comparison voltage and said proportional voltage thereby to produce a control voltage, and means including a transformer having a secondary winding in series with said output circuit for applying said control voltage in series with said output circuit in such manner that said difference in voltage is consequently reduced, said means for deriving said proportional voltage including an intermediate tap on said secondary winding.

6. In an alternating voltage stabilization circuit comprising an input circuit adapted for the application thereto of a source of alternating voltage to be stabilized, an output circuit adapted to be connected to a load, squaring means comprising a squaring unit for deriving from said source an electrical wave having a substantially rectangular waveform substantially in phase with said source, said squaring means comprising material having a non-linear volt-ampere characteristic, a clipper circuit for clipping said rectangular wave at a predetermined level to provide a precision rectangular wave of predetermined amplitude, filtering means for attenuating from said precision rectangular wave substantially all harmonic frequencies above fundamental frequency of said source thereby to provide a comparison voltage, means for deriving from said output circuit a voltage proportional to the output voltage, means for amplifying the difference between said comparison voltage and said proportional voltage thereby to produce a control voltage, and means for applying said control voltage in series with said output circuit in such manner that said difference in voltage is consequently reduced.

7. An alternating voltage stabilization circuit comprising an input circuit adapted for the application thereto of a source of alternating voltage to be stabilized, an output circuit adapted to be connected to a load, a squaring unit, said squaring unit including material having a non-linear volt-ampere characteristic, means for energizing said squaring unit from said source thereby to provide an electrical wave having a substantially rectangular waveform substantially in phase with said source, a clipper circuit including an electron discharge device adapted and arranged to operate under anode-limiting conditions for clipping said rectangular wave thereby to provide a precision rectangular wave, a stabilized rectifier circuit adapted and arranged to be energized by said source to provide a stable operating potential for said device, filtering means for attenuating from said precision rectangular wave substantially all harmonic frequencies above the fundamental frequency of said source thereby to provide a comparison voltage, means for deriving from said output circuit a voltage proportional to the output voltage, means for amplifying the difference between said comparison voltage and said proportional voltage thereby to produce a control voltage, and means for applying said control voltage in series with said output circuit in such manner that said difference in voltage is consequently reduced.

8. A circuit as defined in claim 5 wherein the squaring means comprises material having a non-linear volt-ampere characteristic.

9. In a circuit as defined in claim 1, the improvement wherein said squaring means is characterized by the provision of at least one element of material formed of silicon carbide.

No references cited.